(12) United States Patent
Nakanishi et al.

(10) Patent No.: US 7,672,771 B2
(45) Date of Patent: Mar. 2, 2010

(54) RETARDER CONTROLLING DEVICE AND METHOD

(75) Inventors: Hitoshi Nakanishi, Mooka (JP); Sachio Obara, Mooka (JP); Satoshi Sawafuji, Mooka (JP)

(73) Assignee: Komatsu Ltd., Tokyo (JP)

( * ) Notice: Subject to any disclaimer, the term of this patent is extended or adjusted under 35 U.S.C. 154(b) by 194 days.

(21) Appl. No.: 11/795,139

(22) PCT Filed: Jan. 17, 2006

(86) PCT No.: PCT/JP2006/300514

§ 371 (c)(1),
(2), (4) Date: Jul. 12, 2007

(87) PCT Pub. No.: WO2006/075757

PCT Pub. Date: Jul. 20, 2006

(65) Prior Publication Data

US 2008/0071453 A1    Mar. 20, 2008

(30) Foreign Application Priority Data

Jan. 17, 2005   (JP)   ............................ 2005-009233

(51) Int. Cl.
*G06F 19/00* (2006.01)
(52) U.S. Cl. ...................... 701/70; 477/94; 477/118; 477/186
(58) Field of Classification Search ................ 701/70, 701/93; 477/118, 186, 187, 94
See application file for complete search history.

(56) References Cited

U.S. PATENT DOCUMENTS

| | | | |
|---|---|---|---|
| 5,097,724 A | 3/1992 | Braun | |
| 5,303,986 A | 4/1994 | VanDeMotter et al. | |
| 5,366,425 A | 11/1994 | Kusaka et al. | |
| 5,516,200 A * | 5/1996 | Tezuka et al. ................ | 303/7 |
| 6,249,733 B1 | 6/2001 | Smith | |

(Continued)

FOREIGN PATENT DOCUMENTS

DE    196 42 344 A1    4/1997

(Continued)

OTHER PUBLICATIONS

Office Action dated Oct. 8, 2008 in corresponding Swedish patent application No. 0701635-5.

(Continued)

*Primary Examiner*—Mark Hellner
(74) *Attorney, Agent, or Firm*—Posz Law Group, PLC

(57) ABSTRACT

There is provided a retarder control device which is simple in constitution and can reliably apply braking. An engine rotational speed detector detects an engine rotational speed, gear step detection means detects a gear step of a transmission, an accelerator operation detector detects the operated state of an accelerator, and a retarder controller previously stores automatic braking amount determination data representing the relation between the engine rotational speed and the automatic braking amount of a retarder corresponding to each gear step of the transmission and controls the retarder according to the automatic braking amount of the retarder calculated from the automatic braking amount determination data based on the detected engine rotational speed and gear step of the transmission when the accelerator is judged to be off from the detected operated state of the accelerator.

8 Claims, 13 Drawing Sheets

U.S. PATENT DOCUMENTS

| | | | |
|---|---|---|---|
| 6,249,735 B1 * | 6/2001 | Yamada et al. | 701/65 |
| 6,299,263 B1 | 10/2001 | Uematsu et al. | |
| 6,478,716 B2 * | 11/2002 | Onimaru et al. | 477/118 |
| 7,134,985 B2 * | 11/2006 | Watanabe et al. | 477/186 |
| 7,225,059 B2 * | 5/2007 | Kettenacker et al. | 701/1 |
| 2002/0096936 A1 | 7/2002 | Ishida et al. | |
| 2004/0195022 A1 * | 10/2004 | Inoue | 180/170 |

FOREIGN PATENT DOCUMENTS

| | | |
|---|---|---|
| JP | A-03-199750 | 8/1991 |
| JP | A-09-046808 | 2/1997 |
| JP | A-10-264804 | 10/1998 |
| JP | A-2002-220039 | 8/2002 |
| JP | A-2004-176692 | 6/2004 |
| WO | WO 2005/080166 A1 | 9/2005 |

OTHER PUBLICATIONS

Office Action dated Oct. 22, 2009 in corresponding Swedish patent application No. 0701635-5 (and English translation).

* cited by examiner

RETARDER CONTROLLING DEVICE AND METHOD

BACKGROUND OF THE INVENTION

1. Field of the Invention

The present invention relates to a retarder control device and control method.

2. Description of the Related Art

A vehicle such as a dump truck is equipped with an auxiliary braking device for braking so as to prevent a vehicle speed from being excessive when a vehicle goes down a long slope. There is known an auxiliary braking device, being called an exhaust brake, that throttles an exhaust throttle valve provided in an exhaust pipe to increase exhaust resistance when an exhaust gas is exhausted from an engine, thereby obtaining a braking force (for instance, see Patent Document 1).

There is also known an auxiliary braking device called a retarder. This transmits an instruction to a braking device or a retarder braking device provided separately from the braking device and controls a vehicle speed to be constant (for instance, see Patent Document 2).

[Patent Document 1] Japanese Patent Application Laid-Open Publication No. 2004-176692

[Patent Document 2] Japanese Patent Application Laid-Open Publication No. 10-264804

SUMMARY OF THE INVENTION

The prior art has the following problems. The exhaust brake disclosed in Patent Document 1 has a characteristic to affect the driven state of an engine due to increased exhaust resistance. In order to increase controllability of an engine rotational speed, the exhaust brake is typically decoupled automatically at the time of actuation of a torque converter. The deceleration effect can thus be deteriorated.

According to the prior art disclosed in Patent Document 2, braking control is performed to make a vehicle speed constant. This cannot be used to decelerate a vehicle running on flat ground in the state that an accelerator is 100% off. For instance, this cannot be used to continue safe running of the vehicle by keeping on automatically reducing the vehicle speed, aside from a foot brake of a driver, so as to prevent the vehicle speed from being excessive when the vehicle goes down a long slope.

The present invention has been made by noting the above problems and an object of the present invention is to provide a retarder control device and control method which can apply effective braking automatically and reliably.

A retarder control device according to a first aspect of the present invention includes vehicle speed-related value detection means for detecting a vehicle speed-related value; accelerator operation detection means for detecting the operated state of an accelerator; and a retarder controller previously storing automatic braking amount determination data representing the relation between the vehicle speed-related value and the automatic braking amount of a retarder and controlling the retarder according to the automatic braking amount of the retarder calculated from the automatic braking amount determination data based on the detected vehicle speed-related value when the accelerator is judged to be off from the detected operated state of the accelerator.

In a preferred embodiment according to the first aspect of the present invention, the vehicle speed-related value detection means includes an engine rotational speed detector detecting an engine rotational speed; and gear step detection means for detecting a gear step of a transmission, and the retarder controller calculates the automatic braking amount of the retarder from the automatic braking amount determination data based on the detected engine rotational speed and gear step of the transmission.

According to another embodiment, the retarder control device further includes a loading weight detector detecting the loading weight of a load, wherein the retarder controller increases the automatic braking amount of the retarder as the loading weight becomes larger.

According to a further embodiment, the retarder controller previously stores, as the automatic braking amount determination data, automatic braking amount determination data in unloaded vehicle state, and automatic braking amount determination data in loaded vehicle state which is an automatic braking amount larger than an automatic braking amount from the automatic braking amount determination data in unloaded vehicle state, judges based on an output from the loading weight detector whether the vehicle is in loaded state or in unloaded state, selects based on the judgment either the automatic braking amount determination data in loaded vehicle state or the automatic braking amount determination data in unloaded vehicle state, and calculates the automatic braking amount of the retarder from the selected automatic braking amount determination data.

According to a still further embodiment, the retarder control device further includes manual braking signal detection means for detecting the operational amount of a manual braking signal input device, wherein the retarder controller controls the retarder by the total braking amount of the retarder calculated by subjecting the manual braking amount of the retarder calculated based on the detected operational amount of the manual braking signal input device and the automatic braking amount to predetermined weighting, respectively, and adding the resultant values.

A retarder control method according to a second aspect of the present invention includes the steps of: detecting a vehicle speed-related value; detecting the operated state of an accelerator; previously storing automatic braking amount determination data representing the relation between the vehicle speed-related value and the automatic braking amount of a retarder; and controlling the retarder according to the automatic braking amount of the retarder calculated from the automatic braking amount determination data based on the detected vehicle speed-related value when the accelerator is judged to be off from the detected operated state of the accelerator.

A retarder control method according to a third aspect of the present invention includes the steps of: previously storing automatic braking amount determination data representing the relation between an engine rotational speed and the automatic braking amount of a retarder corresponding to each gear step of a transmission; detecting an engine rotational speed, a gear step of the transmission, and the operated state of an accelerator; and calculating the automatic braking amount of the retarder from the automatic braking amount determination data based on the detected engine rotational speed and gear step of the transmission when the accelerator is judged to be off from the detected operated state of the accelerator.

A preferred embodiment according to the third aspect of the present invention, the retarder control method further includes the steps of: detecting the operational amount of a manual braking signal input device; calculating the manual braking amount of the retarder based on the detected operational amount of the manual braking signal input device; and determining the total braking amount of the retarder by weighting the automatic braking amount and the manual braking amount of the retarder, respectively, and adding the resultant values.

According to the present invention, it is possible to provide a retarder control device and control method which can apply effective braking automatically and reliably.

EXPLANATION OF REFERENCE NUMERALS

11: Dump truck, 14: Front suspension, 15: Cab, 16: Rear suspension, 17: Front wheel, 18: Center wheel, 19: Rear wheel, 20: Coupling device, 21: Body, 22: Front suspension pressure detector, 23: Rear suspension pressure detector, 24: Front body, 25: Rear body, 26: Lift cylinder, 27: Front frame, 28: Rear frame, 29: Equalizer bar pin, 30: Equalizer bar, 31: Spring, 32: Body pin, 33: Retarder controller, 34: Engine, 35: Torque converter, 36: Transmission, 37: Transfer device, 38: Front differential gear, 39: Center differential gear, 40: Rear differential gear, 41: Transmission output shaft, 42: Front output shaft, 43: Rear output shaft, 44: Front terminal reduction gear, 45: Center terminal reduction gear, 46: Rear terminal reduction gear, 48F: Front brake, 48C: Center brake, 48R: Rear brake, 50: Retarder control device, 51: Engine rotational speed detector, 52: Vehicle speed detector, 54: Retarder lever, 55: Retarder lever operational amount detector, 56: Retarder system switch, 57: Accelerator operation detector, 58: Brake pedal, 59: Foot brake valve, 60: Retarder valve, 61: Shuttle valve, 62: Retarder pipe, 63: Foot brake pipe, 64: Brake pipe, 65: Brake cylinder, 66: Transmission controller, 67: Engine output shaft, 68: Torque converter output shaft, 69: Accelerator pedal, 70: Oil pressure source, 71: Manual braking signal input unit, 72: Vehicle state signal input unit, 73: Storage unit, 74: Manual braking amount computation unit, 75: Automatic braking amount computation unit, 76: Total braking amount computation unit, 77: Total braking signal output unit, 79: Retarder actuator, 80: Lock-up mechanism, 81: Vehicle state detection means, 82: Piston, 83: Cylinder, 84: Oil, 85: Nitrogen gas, 86: First orifice, 87: Second orifice, 88: Check ball, 89: Pressure measurement hole, 90: Cavity, 91: Bus

DESCRIPTION OF THE PREFERRED EMBODIMENTS

Embodiments of the present invention will be described below in detail with reference to the drawings.

Figure 1:
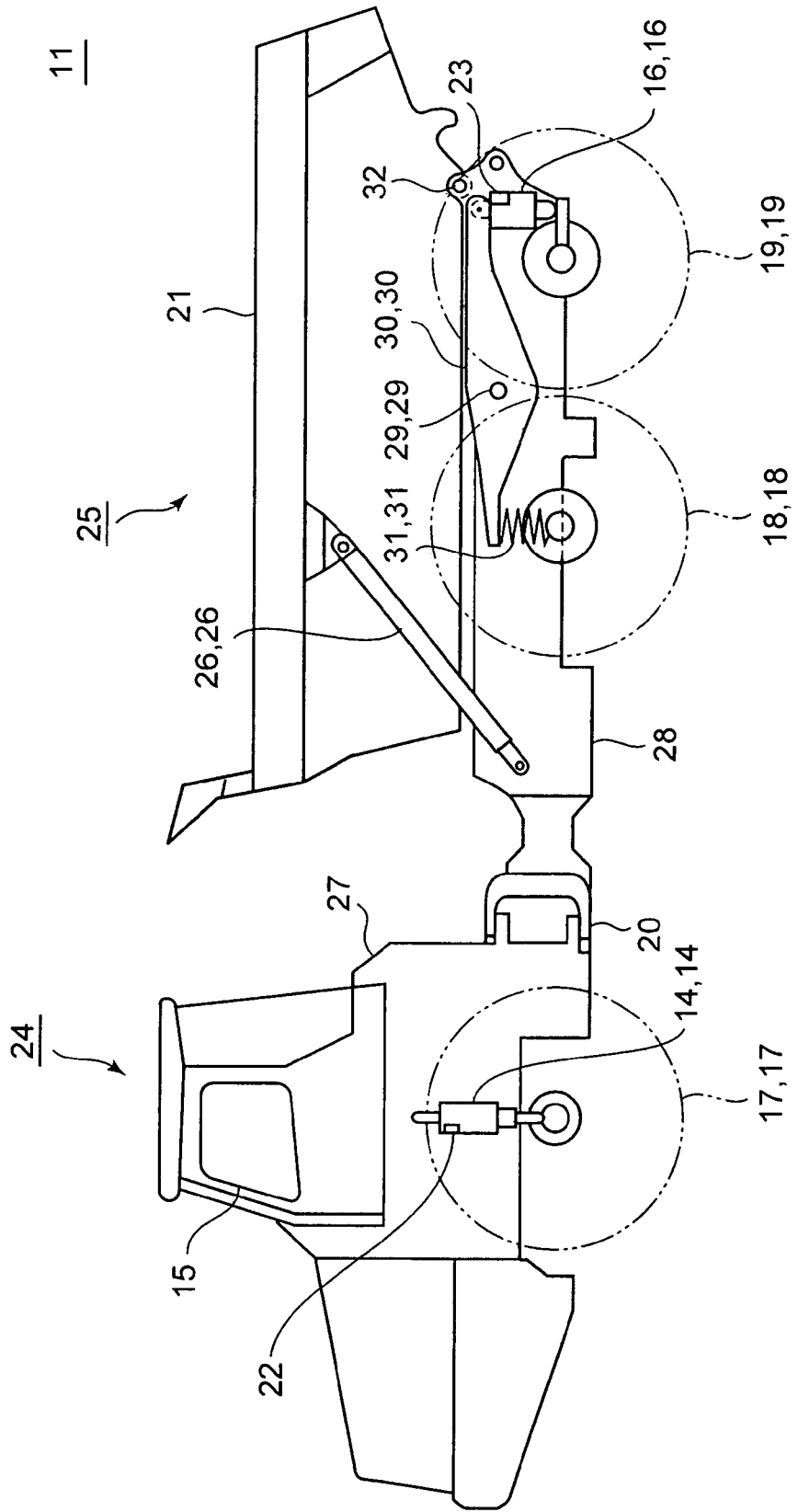
FIG. 1 is a side view of a dump truck (an embodiment)

FIG. 1 shows a side view of an articulated dump truck 11 (hereinafter, called the dump truck 11). The dump truck 11 has a front frame 27 supporting a front body 24 and a rear frame 28 supporting a rear body 25. The rear frame 28 is coupled to the front frame 27 by a coupling device 20 so as to be bent to the right and left of the traveling direction and to be swingably about the traveling direction as a rotating axis.

The front frame 27 has a cab 15 mounted thereon. The front frame 27 is fitted with a pair of right and left front wheels 17 via front suspensions 14, 14.

A body 21 loaded with a load such as earth and sand is mounted above the rear frame 28. The body 21 is rotated in the up-and-down direction about a rear body pin 32 by expansion and contraction of lift cylinders 26, 26.

Right and left equalizer bars 30, 30 are rotatably engaged to the rear frame 28 by equalizer bar pins 29, 29. Center wheels 18, 18 are supported on the front ends of the equalizer bars 30, via springs 31, 31. Rear wheels 19, 19 are supported on the rear ends of the equalizer bars 30, 30 via rear suspensions 16, 16.

Figure 2:
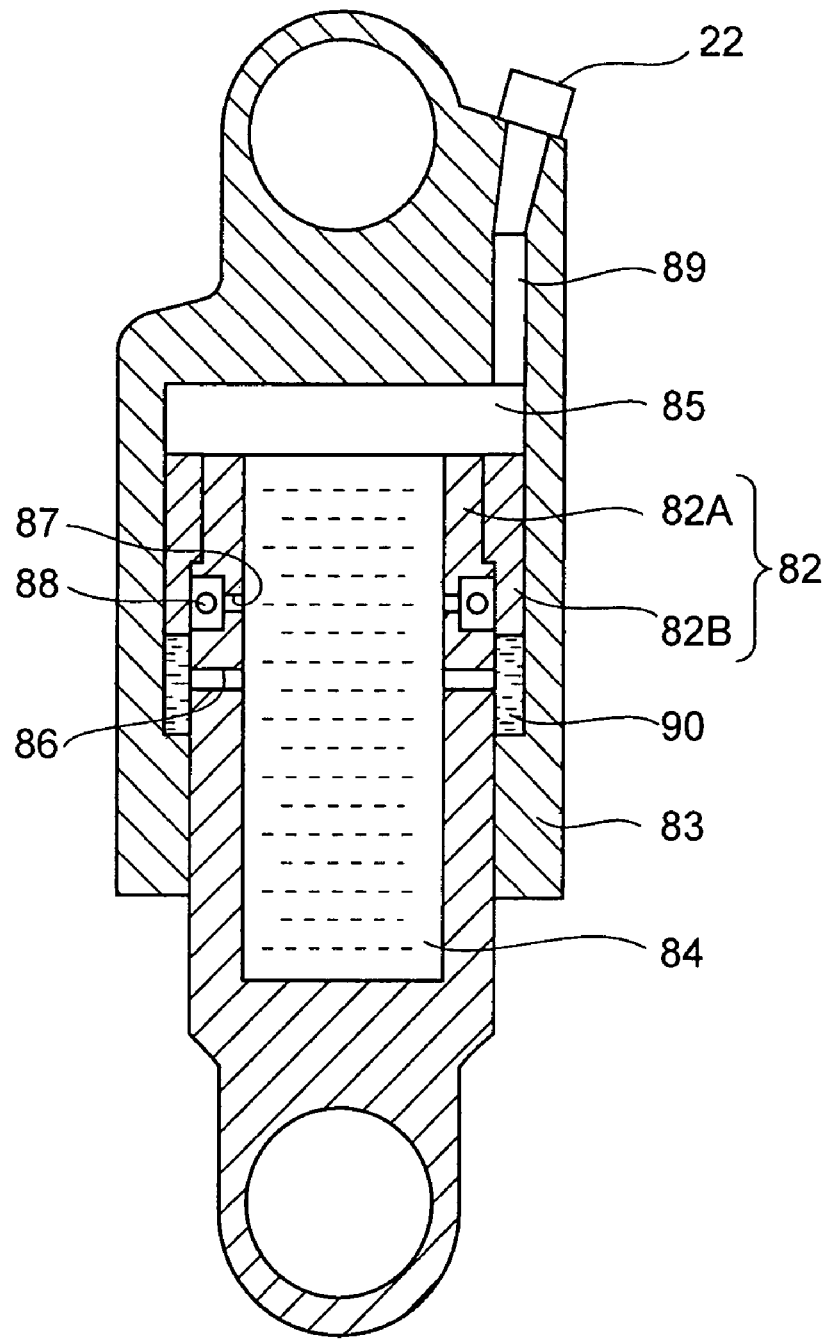
FIG. 2 is a cross-sectional view of a suspension (an embodiment)

FIG. 2 shows a cross-sectional view of the front suspension 14. As shown in FIG. 2, the front suspension 14 has a piston 82 including parts 82A, 82B, and a cylinder 83. Oil 84 and nitrogen gas 85 are enclosed in the piston 82. A cavity 90 is provided between the piston 82 and the cylinder 83.

A predetermined number of first orifices 86 are provided circumferentially in predetermined positions in the longitudinal direction in the piston 82. A predetermined number of second orifices 87 are provided circumferentially in positions different from those of the first orifices 86 in the longitudinal direction. Check balls 88 are provided outside the second orifices 87.

The cylinder 83 has a pressure measurement hole 89 with a front suspension pressure detector 22 attached thereto. The front suspension pressure detector 22 measures the pressure of the nitrogen gas 85 to determine the pressure of the oil 84 in the cylinder 83 and outputs a signal according to this. The rear suspension 16 has a substantially similar constitution, and has a rear suspension pressure detector 23 detecting and outputting the pressure of oil therein.

Figure 3:
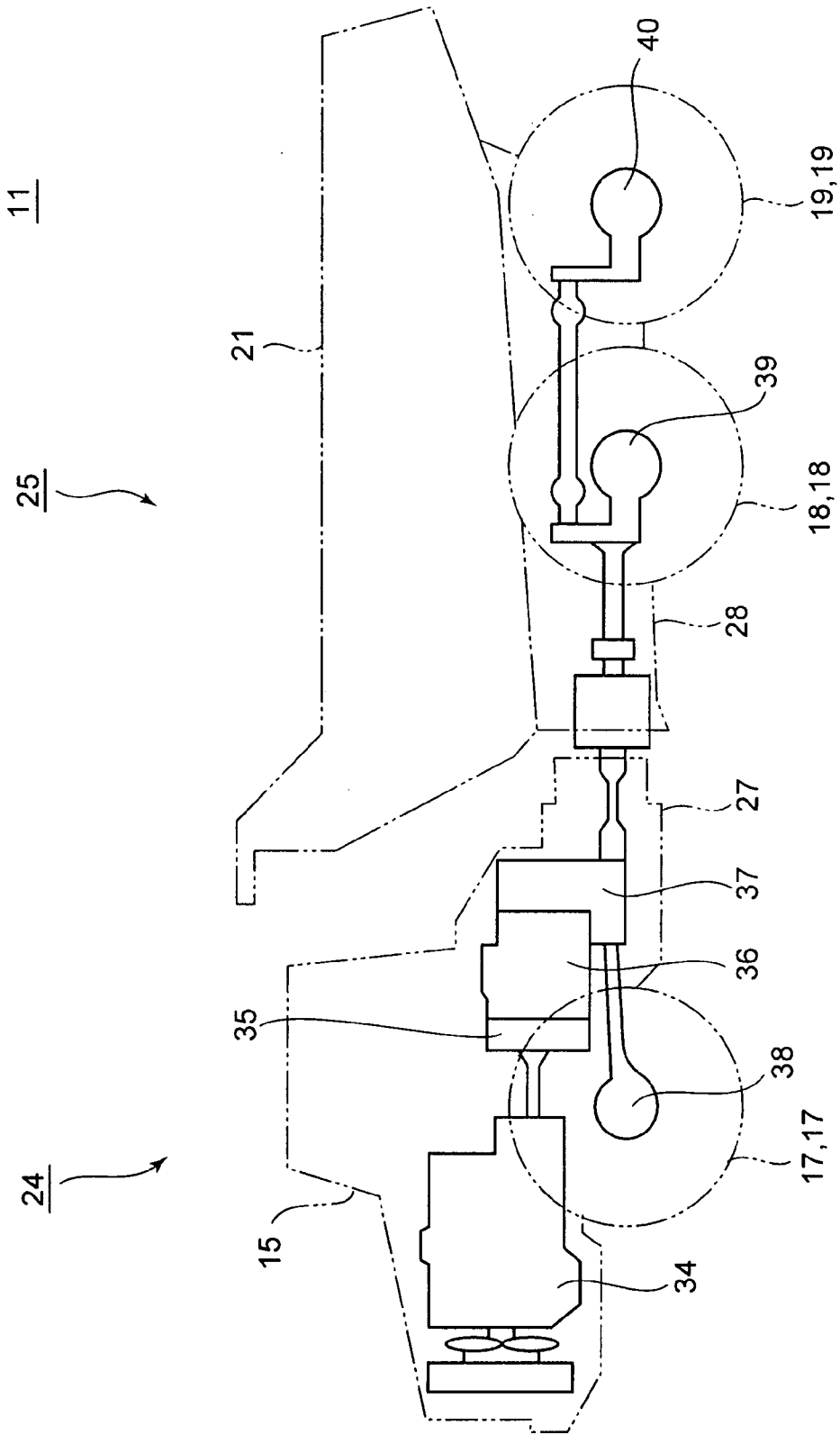
FIG. 3 is an explanatory view of a power line (an embodiment)
Figure 4:
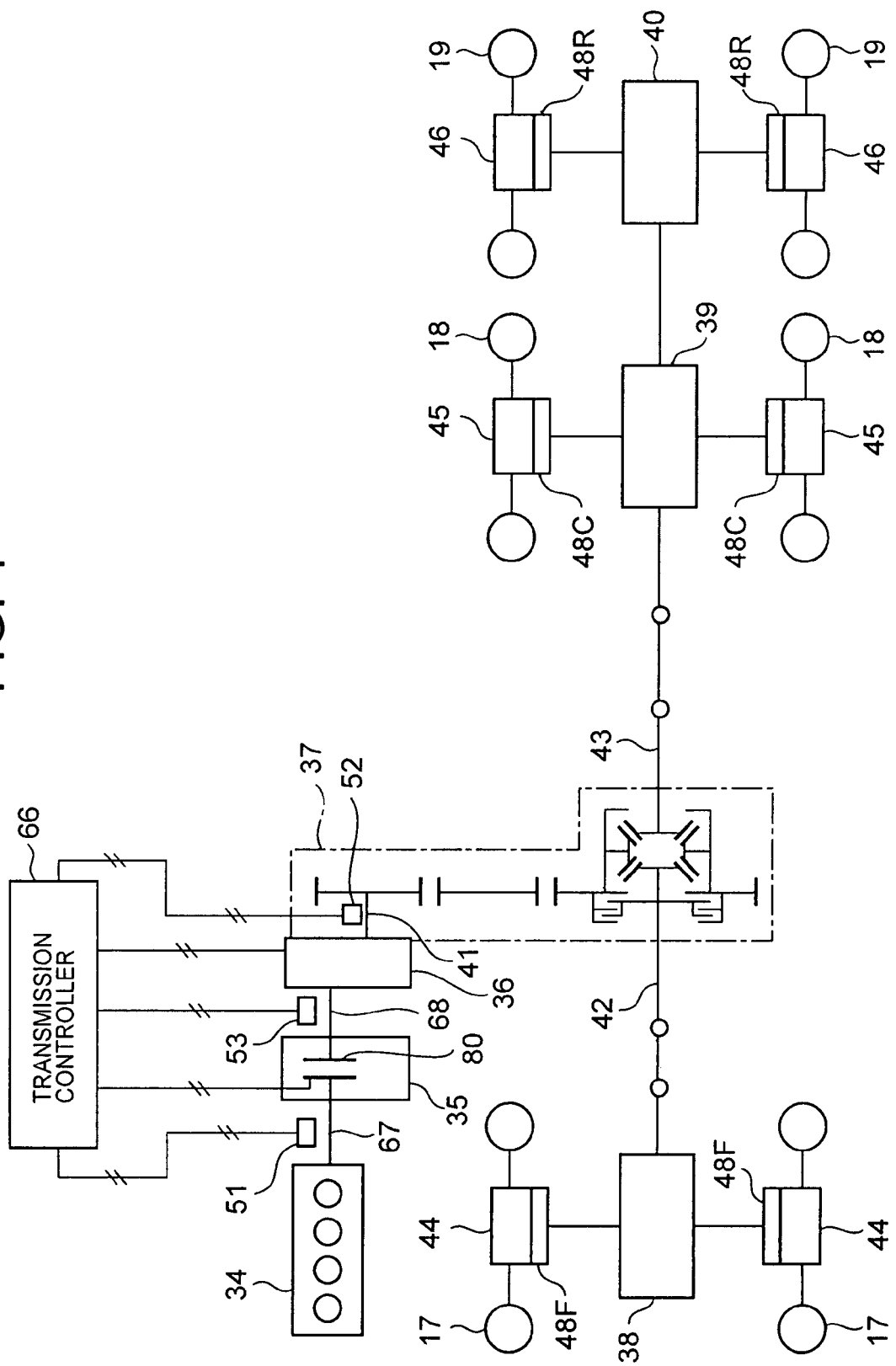
FIG. 4 is a block diagram of the power line (an embodiment)

FIG. 3 shows a power line of the dump truck 11. FIG. 4 shows a system diagram of the power line. In FIGS. 3 and 4, an output shaft 67 of an engine 34 mounted on the lower side of the cab 15 is connected to a torque converter 35. An output shaft 68 of the torque converter 35 is connected to a transmission 36. A lock-up mechanism 80 directly connecting (locking-up) the output shaft 67 of the engine 34 and the output shaft 68 of the torque converter 35 is incorporated in the torque converter 35.

The transmission 36 has gear steps (not shown) including six forward steps (F1-F6) and two rearward steps (R1-R2). A transmission output shaft 41 is connected to a transfer device 37 dividing an input into front and rear sides for output.

A front output shaft 42 of the transfer device 37 is connected from a front differential gear 38 via front terminal reduction gears 44, 44 to the front wheels 17, 17. A rear output shaft 43 is connected from a center differential gear 39 via center terminal reduction gears 45, 45 to center wheels 18, 18. An output shaft of the center differential gear 39 is connected from a rear differential gear 40 via rear terminal reduction gears 46, 46 to the rear wheels 19, 19.

The output shaft 67 of the engine 34 is provided with an engine rotational speed detector 51 detecting an engine rotational speed. The output shaft 68 of the torque converter 35 is provided with a torque converter rotational speed detector 53 detecting the rotational speed of the output shaft 68. The output shaft 41 of the transmission 36 is provided with a vehicle speed detector 52 detecting the rotational speed of the output shaft 41.

A gear step of the transmission 36 is determined by a transmission controller 66 (not shown in FIG. 3). The transmission controller 66 outputs a gear step instruction signal to the transmission 36 to perform gear change.

There will be described below an example of the procedure for determining a gear step by the transmission controller 66. As shown in FIG. 4, the transmission controller 66 is electrically connected to the torque converter rotational speed detector 53, and can detect the rotational speed of the output shaft 68 based on its output signal. The transmission controller 66 previously stores a first threshold rotational speed shifting down each gear step and a second threshold rotational speed shifting up each gear step.

The transmission controller 66 outputs the gear step instruction signal to the transmission 36 so as to perform shifting-down when the rotational speed of the output shaft 68 is lower than the first threshold rotational speed. The transmission controller 66 outputs the gear step instruction signal to the transmission 36 so as to perform shifting-up when the rotational speed of the output shaft 68 is higher than the second threshold rotational speed. This performs gear change.

The lock-up mechanism 80 is driven by a lock-up instruction signal outputted from the transmission controller 66 so as to perform lock-up. The transmission controller 66 previously stores a third threshold rotational speed determining whether or not each gear step is locked up.

When the rotational speed of the output shaft 68 is higher than the third threshold rotational speed, the transmission controller 66 outputs the lock-up instruction signal to perform lock-up. When the rotational speed of the output shaft 68 is lower than the third threshold rotational speed, the transmission controller 66 stops the lock-up instruction signal to release lock-up.

As shown in FIG. 4, the dump truck 11 has front brakes 48F, 48F braking the front wheels 17, 17, center brakes 48C, 48C braking the center wheels 18, 18, and rear brakes 48R, 48R braking the rear wheels 19, 19.

The front brake 48F, the center brake 48C, and the rear brake 48R are driven by a brake pedal 58 (not shown in FIGS. 3 and 4) installed in the cab 15.

The front brake 48F and the center brake 48C can be operated by a retarder control device 50 described later, and are used as a retarder.

Figure 5:
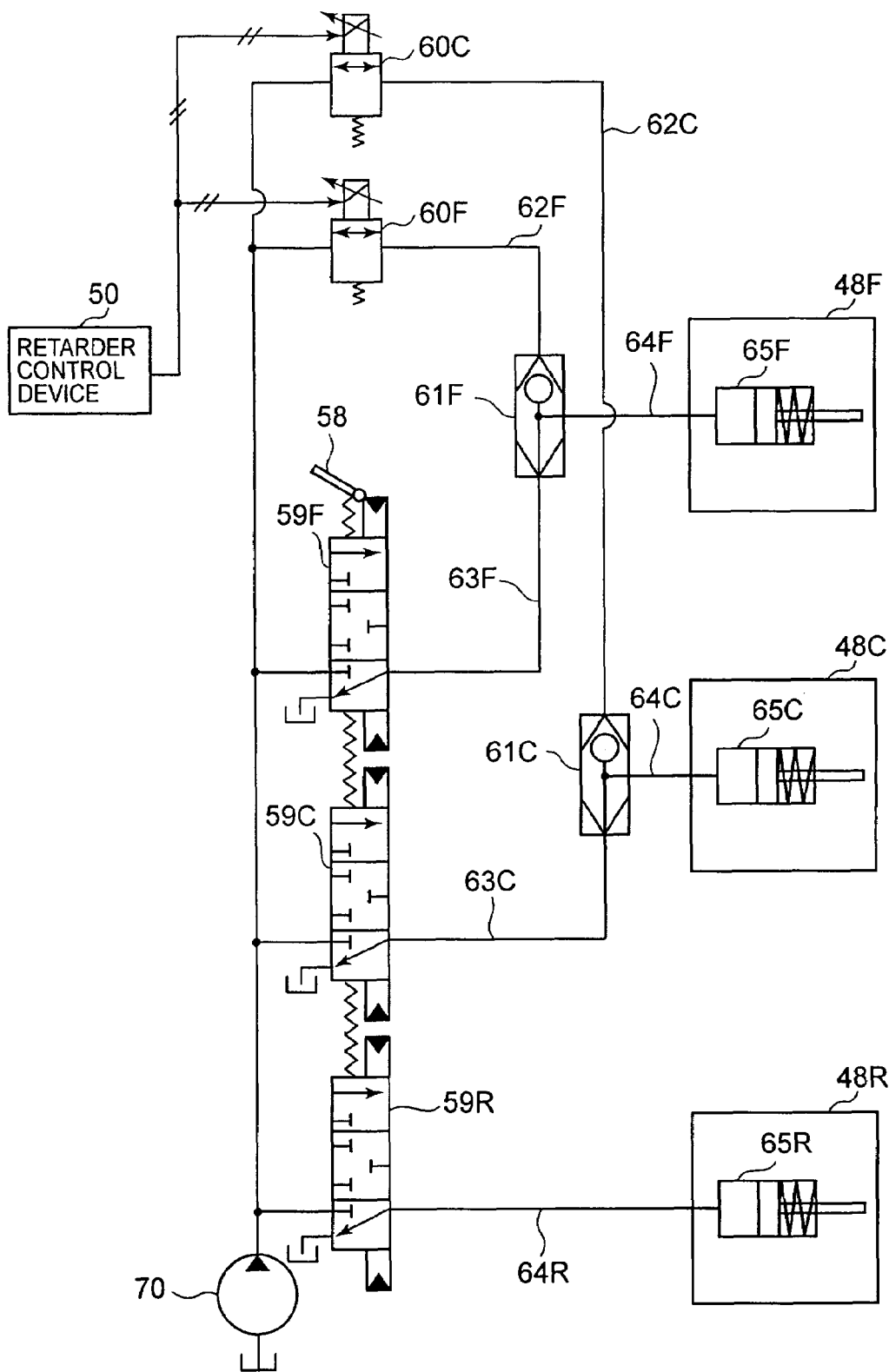
FIG. 5 is a schematic block diagram of a retarder system (an embodiment)

The operation of a brake system having such front brake 48F, center brake 48C, and rear brake 48R will be described below. FIG. 5 shows a block diagram of the brake system.

The brake system has front, center, and rear foot brake valves 59F, 59C, and 59R each constituted by a three-port switching valve. The foot brake valves 59F, 59C, and 59R work by operating the brake pedal 58.

The brake system also has front and center retarder valves 60F, 60C each constituted by an electromagnetic valve. The retarder valves 60F, 60C are operated by a total braking signal (described later) outputted from the retarder control device 50.

As shown in FIG. 5, an outlet of the rear foot brake valve 59R is connected via a rear brake pipe 64R to a rear brake cylinder 65R in the rear brake 48R.

Outlets of the front and center foot brake valves 59F, 59C are connected via front and center foot brake pipes 63F, 63C to inlets at one side of front and center shuttle valves 61F, 61C, respectively.

Outlets of the front and center retarder valves 60F, 60C are connected via front and center retarder pipes 62F, 62C to inlets at the other side of the front and center shuttle valves 61F, 61C, respectively.

Outlets of the front and center shuttle valves 61F, 61C are connected via brake pipes 64F, 64C to front and center brake cylinders 65F, 65C in the front and center brakes 48F, 48C, respectively.

When an operator presses the brake pedal 58, the foot brake valves 59F, 59C, and 59R are opened only by an amount according to the step amount. Foot brake oil in an amount according to the step amount is flowed from an oil pressure source 70 to the foot brake pipes 63F, 63C and the brake pipe 64R, respectively.

The foot brake oil flowed to the rear brake pipe 64R drives the rear brake cylinder 65R to operate the rear brake 48R. The foot brake oil flowed to the front and center foot brake pipes 63F, 63C reaches inlets at one side of the front and center shuttle valves 61F, 61C.

The retarder control device 50 calculates braking strength (hereinafter, called a total braking amount) of the retarder based on the later-described computation procedure, and outputs the total braking signal according to the total braking amount to the retarder valves 60F, 60C. The retarder valves 60F, 60C are opened only by an amount according to the total braking signal.

The retarder brake oil in an amount according to the total braking signal is flowed from the oil pressure source 70 to the retarder pipes 62F, 62C, and reaches inlets at the other side of the front and center shuttle valves 61F, 61C.

To the brake pipes 64F, 64C, the shuttle valves 61F, 61C permit flowing of one of the foot brake oil reaching inlets at one side and the retarder brake oil reaching inlets at the other side which has a higher pressure.

The brake oil which has passed through the brake pipes 64F, 64C drives the brake cylinders 65F, 65C in the front brake 48F and the center brake 48C. The front brake 48F and the center brake 48C are operated, respectively, to perform braking.

The retarder control device 50 will be described.

Figure 6:
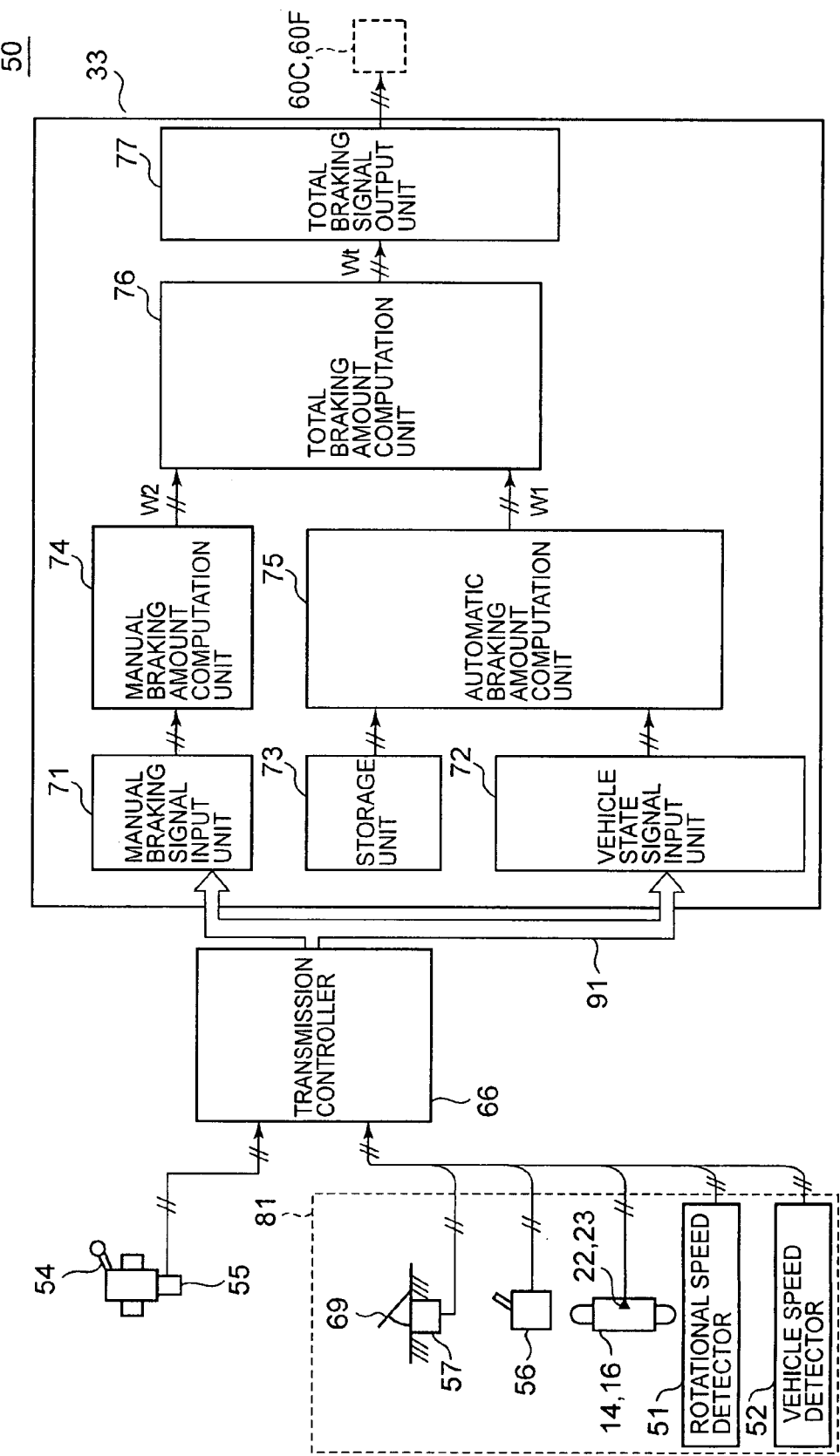
FIG. 6 is a block diagram of the retarder system (an embodiment)

FIG. 6 shows a block diagram of the retarder control device 50. As shown in FIG. 6, the retarder control device 50 has a manual braking signal input device 54 manually operated by the operator, manual braking signal detection means 55 for detecting the operational amount thereof, vehicle state detection means 81 for detecting the running state of the vehicle (hereinafter, called vehicle state), the transmission controller 66, and a retarder controller 33.

The retarder controller 33 will be described.

The retarder controller 33 has a manual braking signal input unit 71, a vehicle state signal input unit 72, a storage unit 73, a manual braking amount computation unit 74, an automatic braking amount computation unit 75, a total braking amount computation unit 76, and a total braking signal output unit 77.

The manual braking signal input unit 71 receives an output signal of the manual braking signal detection means 55 via the transmission controller 66 and a communication bus 91 to output this to the manual braking amount computation unit 74. The manual braking amount computation unit 74 calculates a parameter called a manual braking amount W2 according to the operational amount of the manual braking signal input device 54 by the later-described computation procedure based on the output signal of the manual braking signal detection means 55.

The vehicle state signal input unit 72 receives an output signal of the vehicle state signal detection means 81 via the transmission controller 66 and the communication bus 91 to output this to the automatic braking amount computation unit 75. The automatic braking amount computation unit 75 calculates a parameter called an automatic braking amount W1 according to a vehicle state by the later-described computation procedure based on the output signal of the vehicle state signal detection means 81 and automatic braking amount determination data previously stored in the storage unit 73.

The calculated manual braking amount W2 and automatic braking amount W1 are transmitted to the total braking amount computation unit 76. The total braking amount computation unit 76 calculates a total braking amount Wt by the later-described computation procedure based on the manual braking amount W2 and the automatic braking amount W1. The total braking signal output unit 77 to which the total braking amount Wt is inputted outputs the total braking signal according to the total braking amount Wt to the retarder valves 60F, 60C.

The retarder control device 50 determines the total braking amount Wt from the manual braking amount W2 determined from the operational amount of the manual braking signal input device 54 and the automatic braking amount W1 determined from the vehicle state to output the total braking signal according to this.

The manual braking signal input device 54 and the manual braking signal detection means 55 will be described. The retarder control device 50 has, as the manual braking signal input device 54, a retarder lever 54 which is installed in the cab 15 and can be operated by the operator.

The retarder lever 54 has, as the manual braking signal detection means 55, the retarder lever operational amount detector 55 outputting a signal according to the operational amount of the retarder lever 54. A potentiometer is suitable as the retarder lever operational amount detector 55.

As described above, the retarder lever operational amount detector 55 is connected to the transmission controller 66. The transmission controller 66 transmits an output signal of the retarder lever operational amount detector 55 to the manual braking signal input unit 71 of the retarder controller 33 using the communication bus 91.

The manual braking signal input unit 71 outputs the output signal of the retarder lever operational amount detector 55 to the manual braking amount computation unit 74. The manual braking amount computation unit 74 can detect the operational amount of the retarder lever 54.

The vehicle state detection means 81 will be described. The retarder control device 50 has, as the vehicle state detection means 81, a retarder system switch 56, the suspension pressure detectors 22, 23, an accelerator operation detector 57, the engine rotational speed detector 51, and the vehicle speed detector 52.

As described above, these vehicle state detection means 81 are connected to the transmission controller 66. The transmission controller 66 transmits each output signal of the vehicle state detection means 81 to the vehicle state signal input unit 72 of the retarder controller 33 using the communication bus 91. The vehicle state signal input unit 72 outputs this to the automatic braking amount computation unit 75.

The retarder system switch 56 is installed in the cab 15, and can be operated by the operator. When the total braking amount Wt is determined based on only the operational amount of the retarder lever 54, the operator turns off the retarder system switch 56. When the total braking amount Wt is desired to be determined in consideration of a vehicle state as well as the operational amount of the retarder lever 54, the operator turns on the retarder system switch 56.

In the following description, the state that an accelerator pedal 69 is not pressed at all or the state the accelerator pedal 69 is hardly pressed and an operational amount of an accelerator is less than a predetermined value is referred to as the accelerator being off. The accelerator operation detector 57 detects the operational amount of the accelerator. The automatic braking amount computation unit 75 can judge based on an output signal of the accelerator operation detector 57 whether the accelerator is off or not.

When the accelerator pedal 69 is provided with a potentiometer detecting the operational amount of the accelerator, the accelerator operation detector 57 may not be provided additionally and the potentiometer may be used as the accelerator operation detector to judge based on its output signal whether the accelerator is off or not.

As described above, the suspension pressure detectors 22, 23 detect and output the pressure in the suspensions 14, 16. The automatic braking amount computation unit 75 can calculate the load on the front suspension 14 from the output of the front suspension pressure detector 22, and determine the load on the front wheel 17 to which the front suspension 14 is attached.

The automatic braking amount computation unit 75 can calculate the load on the rear suspension 16 from the output of the rear suspension pressure detector 23, and determine the load on the rear wheel 19 to which the rear suspension 16 is attached.

The equalizer bar 30 is not rotated with respect to the equalizer bar pin 29 and is balanced. It is found that the load on the rear suspension 16 is equal to the load on the spring 31. The load on the center wheel 18 is equal to the load on the rear wheel 19.

The automatic braking amount computation unit 75 can perform predetermined computation based on the loads on the front wheel 17, the center wheel 18 and the rear wheel 19, and calculate the loading weight of a load on the body 21. The suspension pressure detectors 22, 23 are used as a loading weight detector detecting the loading weight.

The automatic braking amount computation unit 75 can detect an engine rotational speed based on an output signal of the engine rotational speed detector 51. The automatic braking amount computation unit 75 can detect the vehicle speed of the dump truck 11 based on an output signal of the vehicle speed detector 52.

The transmission controller 66 outputs the gear step instruction signal outputted to the transmission 36 to the automatic braking amount computation unit 75 using the bus 91. The automatic braking amount computation unit 75 can identify the current gear step determined by the transmission controller 66. The transmission controller 66 is used as the gear step detection means.

The transmission controller 66 outputs the lock-up instruction signal outputted to the lock-up mechanism 80 to the automatic braking amount computation unit 75 using the bus 91. The automatic braking amount computation unit 75 can identify whether lock-up is performed or not.

Figure 7:
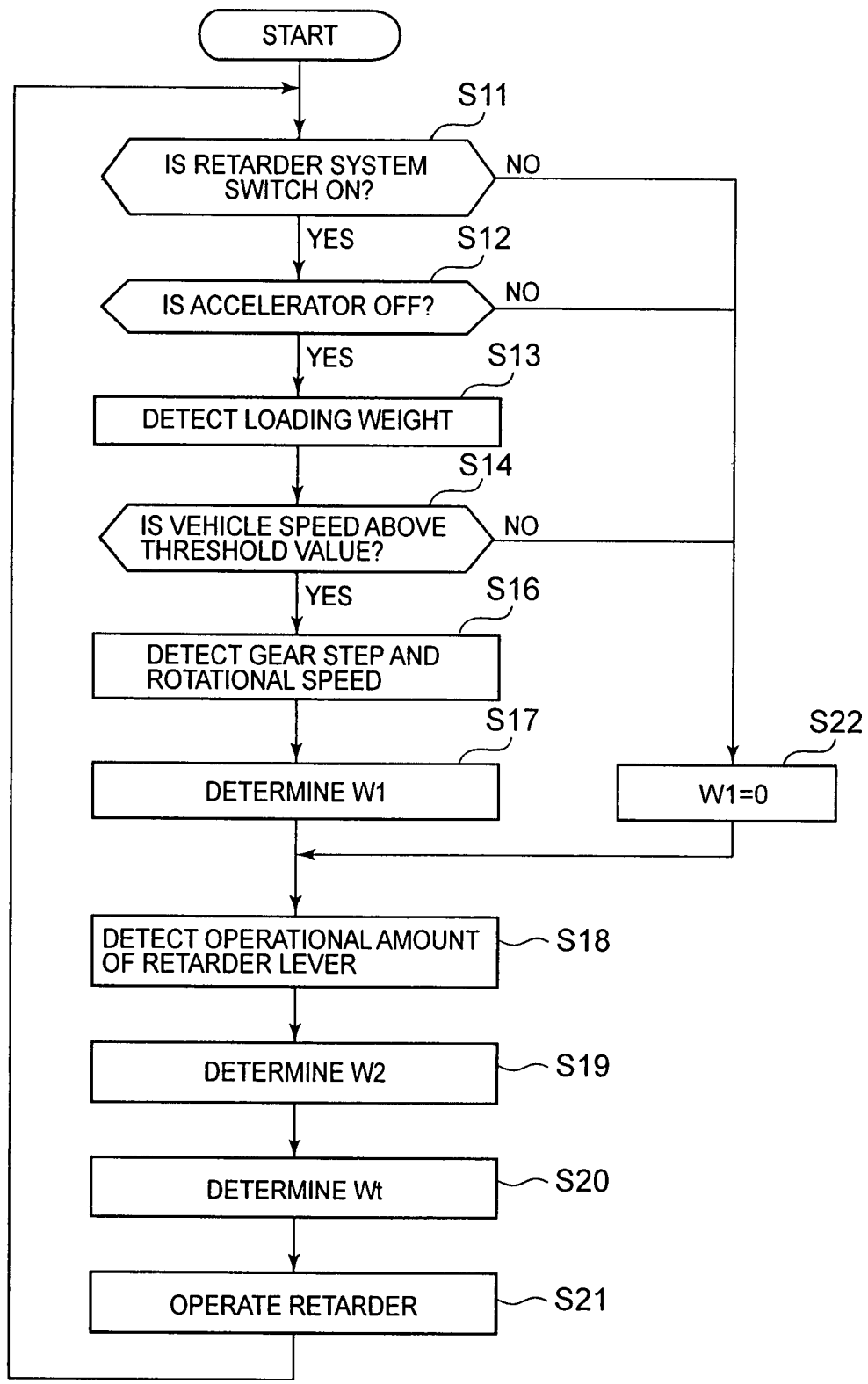
FIG. 7 is a flowchart showing the operation of a brake system (an embodiment)

The computation procedure for determining the total braking amount Wt by the retarder control device 50 will be described using the flowchart shown in FIG. 7.

The automatic braking amount computation unit 75 judges whether the retarder system switch 56 is on or off (step S11).

If the retarder system switch 56 is on in step S11, the automatic braking amount computation unit 75 judges based on an output signal of the accelerator operation detector 57 whether the accelerator is off or not (step S12).

If the accelerator is off in step S12, the automatic braking amount computation unit 75 detects the loading weight of a load based on output signals of the suspension pressure detectors 22, 23 (step S13). The automatic braking amount computation unit 75 performs computation based on an output signal of the vehicle speed detector 52 to calculate a vehicle speed and judges whether the vehicle speed is above a threshold speed or not (step S14).

As the loading weight determined in step S13 is increased, the threshold speed as the judgment reference of step S14 may be reduced. In loaded vehicle state, the retarder can be started earlier to suppress acceleration when the vehicle goes down a slope.

If the vehicle speed is above the threshold speed in step S14, the automatic braking amount computation unit 75 detects a gear step and an engine rotational speed based on an output of the transmission controller 66 and an output signal of the engine rotational speed detector 51 (step S16).

As described later, the storage unit 73 stores the relation between an engine rotational speed and the automatic braking amount W1 of the retarder in each gear step (F1-F6, R1-R2) (hereinafter, called automatic braking amount determination data).

The automatic braking amount computation unit 75 determines the automatic braking amount W1 of the retarder based on the automatic braking amount determination data received from the storage unit 73 and the engine rotational speed and the gear step detected in step S16 (step S17). The automatic braking amount W1 is expressed as a percentage (0-100%) to full brake when the braking amount of full brake is 100%.

If the retarder system switch 56 is off in step S11, the automatic braking amount W1 of the retarder is zero (step S22) and the routine is moved to step S18.

If the accelerator is not off in step S12, the automatic braking amount W1 of the retarder is zero (step S22) and the routine is moved to step S18.

If the vehicle speed is less than the threshold speed in step S14, the automatic braking amount W1 of the retarder is zero (step S22) and the routine is moved to step S18.

When the retarder system switch 56 is off, the accelerator is not off, or the vehicle speed is less than the threshold speed, the automatic braking amount W1 is zero. The total braking amount Wt of the retarder is determined only by the operational amount of the retarder lever 54 detected in step S18. When the operational amount of the retarder lever 54 is zero, the retarder is not operated.

The manual braking amount computation unit 74 detects the operational amount of the retarder lever 54 based on an output signal of the retarder lever operational amount detector 55 (step S18), and determines the manual braking amount W2 of the retarder according to this (step S19). The manual braking amount W2 of the retarder is expressed as a percentage (0-100%) to full brake when the braking amount of full brake is 100%.

The total braking amount computation unit 76 determines the total braking amount Wt of the retarder based on the automatic braking amount W1 and the manual braking amount W2 of the retarder (step S20). The total braking signal output unit 77 outputs a signal according to the total braking amount Wt to the retarder valves 60F, 60C to operate the retarder (step S21). The routine is returned to step S11.

Figure 8:
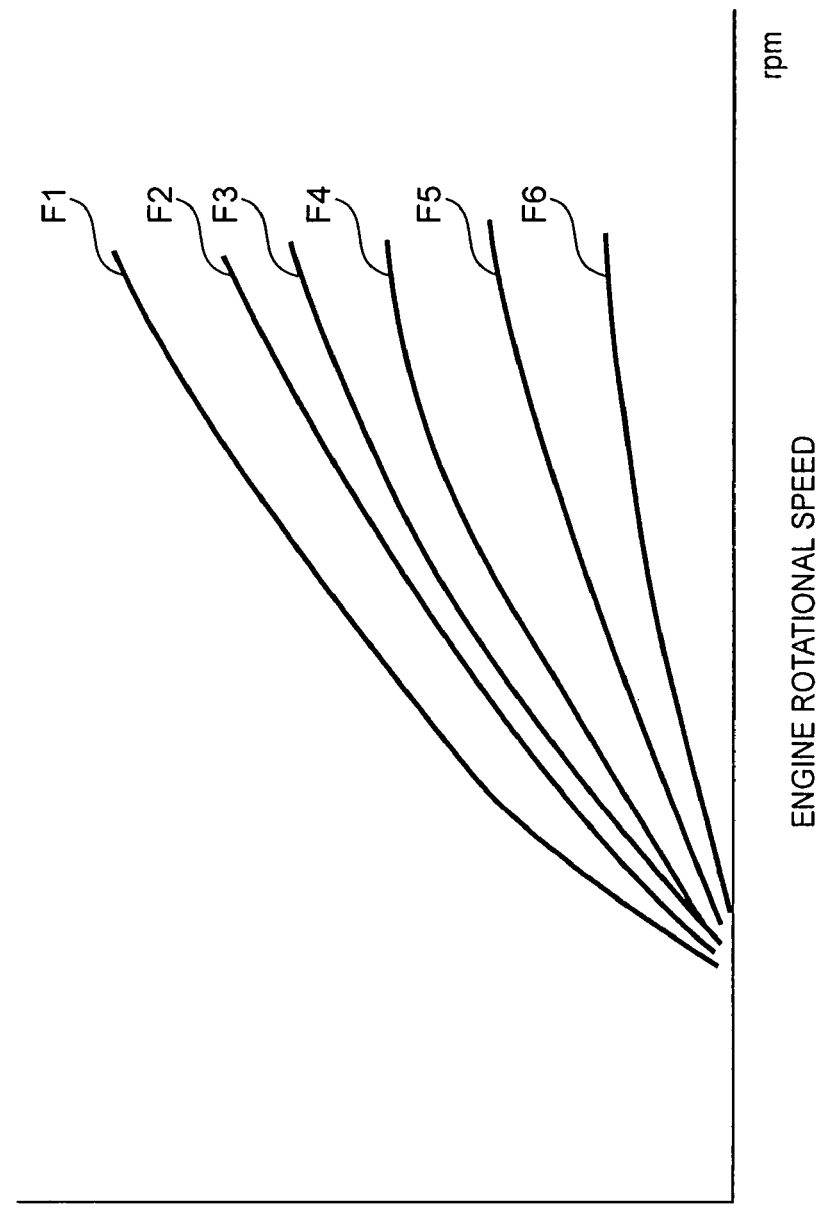
FIG. 8 is a graph determining the automatic braking amount of a retarder (an embodiment)
Figure 9:
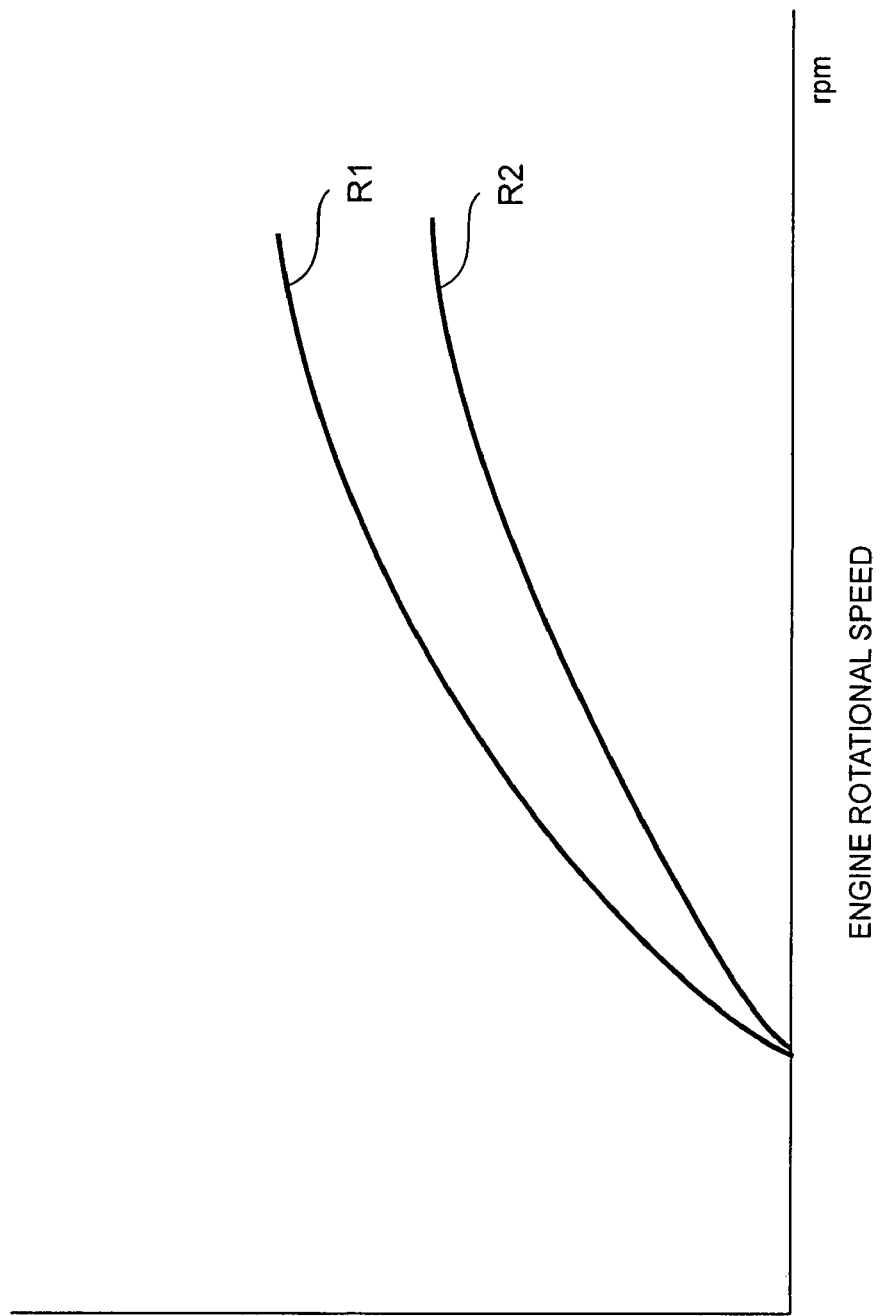
FIG. 9 is a graph determining the automatic braking amount of the retarder (an embodiment)

The computation procedure for determining the automatic braking amount W1 of the retarder in step S17 will be described in detail. FIGS. 8 and 9 show graphs of examples of the automatic braking amount determination data stored in the storage unit 73 in the forward gear steps (F1-F6) and the rearward gear steps (R1-R2) In FIG. 8, an engine rotation speed is indicated on the horizontal axis, and the automatic braking amount W1 of the retarder is indicated on the vertical axis.

According to FIGS. 8 and 9, in the same gear step, as the engine rotational speed becomes higher, the automatic braking amount W1 of the retarder is increased. The vehicle speed is proportional to the engine rotational speed in the same gear step. As the vehicle speed becomes higher, the automatic braking amount W1 of the retarder is increased to enhance a braking force.

According to FIGS. 8 and 9, at the same rotational speed, as the gear step is lowered, the automatic braking amount W1 of the retarder is increased. At the same engine rotational speed, as the gear step is lowered, torque becomes higher. It is necessary to increase the automatic braking amount W1 in order to obtain a necessary braking force.

When the retarder system switch 56 is on, the automatic braking amount W1 of the retarder may be increased in such a manner that a shift-up point and a shift-down point in gear change are higher than at normal running so that an engine rotational speed is always higher.

There will be described the computation procedure for determining the total braking amount Wt of the retarder based on the automatic braking amount W1 and the manual braking amount W2 of the retarder in step S20. By way of example, the total braking amount computation unit 76 of the retarder controller 33 adds the automatic braking amount W1 and the manual braking amount W2 of the retarder so that the sum is the total braking amount Wt.

Figure 10:
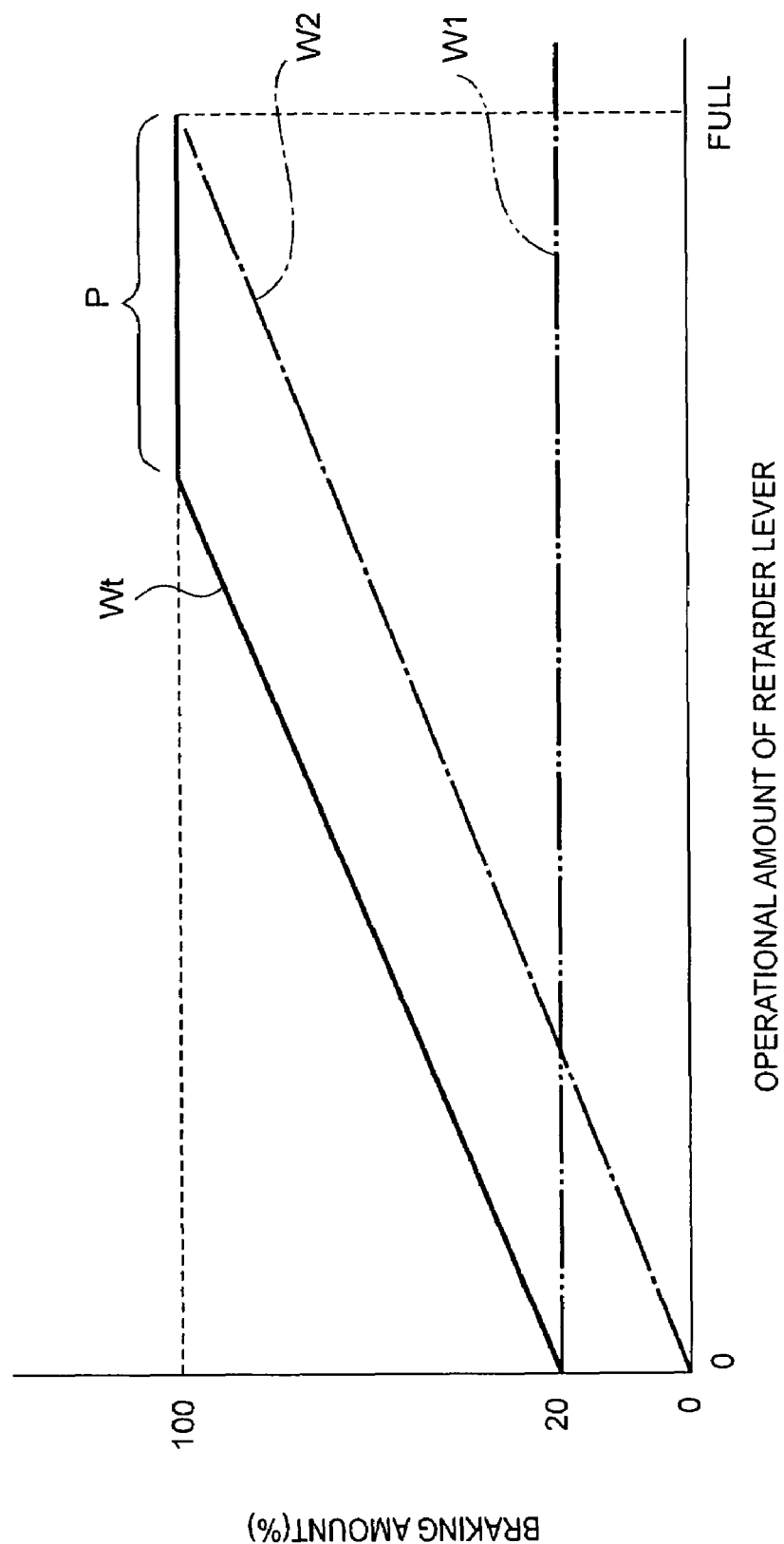
FIG. 10 is a graph determining the total braking amount of the retarder (an embodiment)

FIG. 10 shows a graph of the relation between the automatic braking amount W1, the manual braking amount W2, and the total braking amount Wt. In FIG. 10, the operational amount of the retarder lever 54 is indicated on the horizontal axis, and the braking amount is indicated on the vertical axis.

As shown in step S17, the automatic braking amount computation unit 75 determines based on the gear step and the engine rotational speed in vehicle state at a certain point that the automatic braking amount W1 of the retarder in the certain vehicle state (the alternate long and two short dashes line) is 20%. As indicated by the alternate long and short dash line in FIG. 10, the manual braking amount computation unit 74 determines the manual braking amount W2 in proportion to the operational amount of the retarder lever 54.

The total braking amount computation unit 76 adds the automatic braking amount W1 (20%) in the certain vehicle state to the manual braking amount W2 in proportion to the operational amount of the retarder lever 54 to determine the total braking amount Wt. When the sum of the automatic braking amount W1 and the manual braking amount W2 exceeds 100% corresponding to full brake, the total braking amount Wt is 100% (a P part in FIG. 10).

Another example of the total braking amount Wt will be described using the graph of the relation between the automatic braking amount W1, the manual braking amount W2, and the total braking amount Wt shown in FIG. 11. This eliminates a sense of incongruity of the operator in the case that there is a region in which the total braking amount Wt is not changed when the operational amount of the retarder lever 54 is increased like the P part in FIG. 10.

Figure 11:
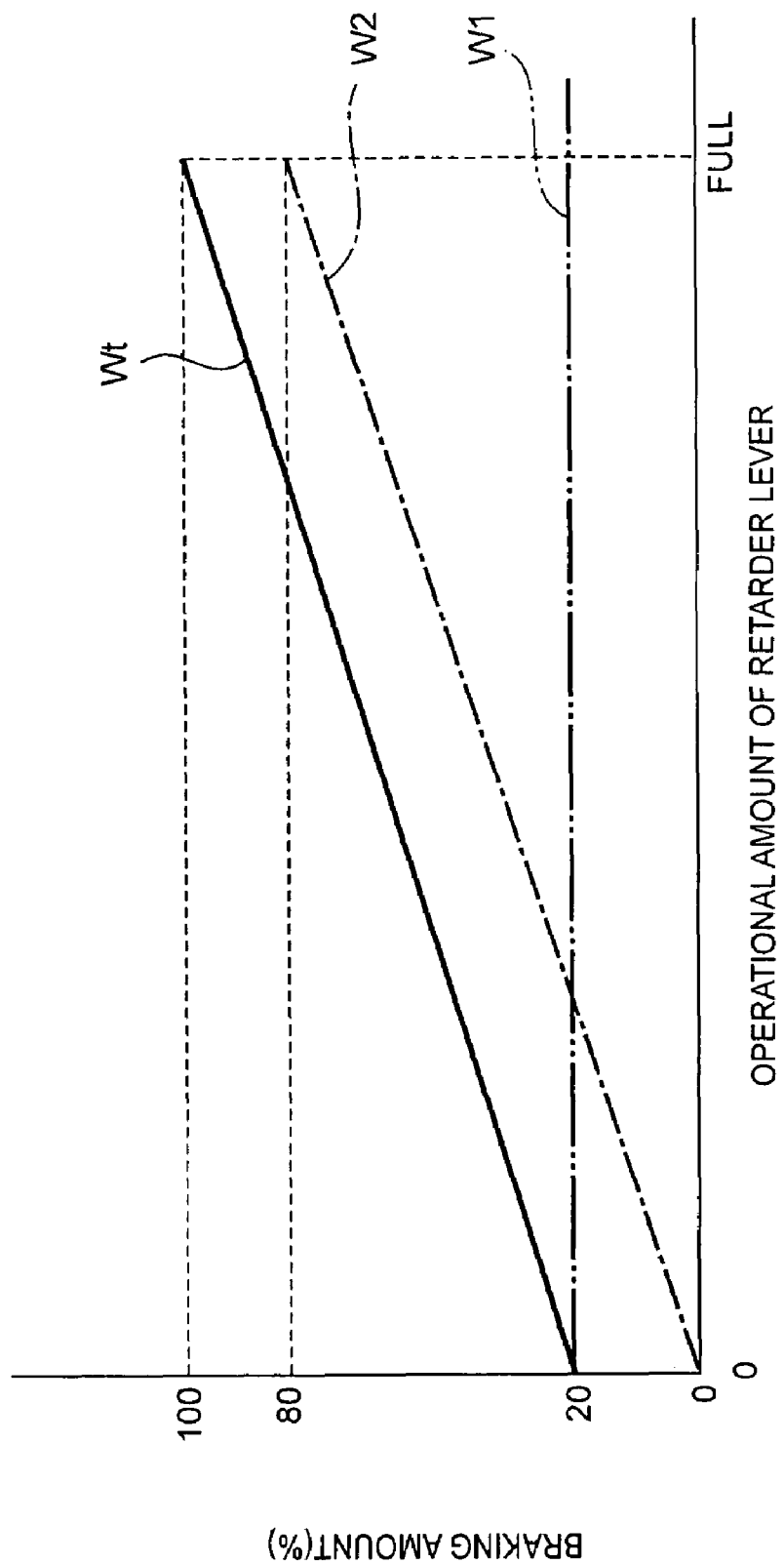
FIG. 11 is a graph determining the total braking amount of the retarder (an embodiment)

As shown in FIG. 11, the manual braking amount computation unit 74 assumes that the maximum value of the manual braking amount W2 determined in proportion to the operational amount of the retarder lever 54 is a value (80%)

obtained by subtracting the automatic braking amount W1 (here, 20%) from 100%. The sum of the automatic braking amount W1 and the manual braking amount W2 is the total braking amount Wt. The sum of the automatic braking amount W1 ($\leq$80%) and the manual braking amount W2 (=20%) does not exceed 100%. As the operator increases the operational amount of the retarder lever 54, the total braking amount Wt always becomes larger. The sense of incongruity is reduced so that a braking force according to the intention of the operator can be obtained.

In the above description of the computation procedure for determining the total braking amount Wt of the retarder, the total braking amount Wt is simply the sum of the automatic braking amount W1 and the manual braking amount W2. The present invention is not limited to this. For instance, the automatic braking amount W1 and the manual braking amount W2 may be multiplied by weighting coefficients n1, n2, respectively, to be added for determining the total braking amount Wt so that Wt=n1·W1+n2·W2.

Figure 12:
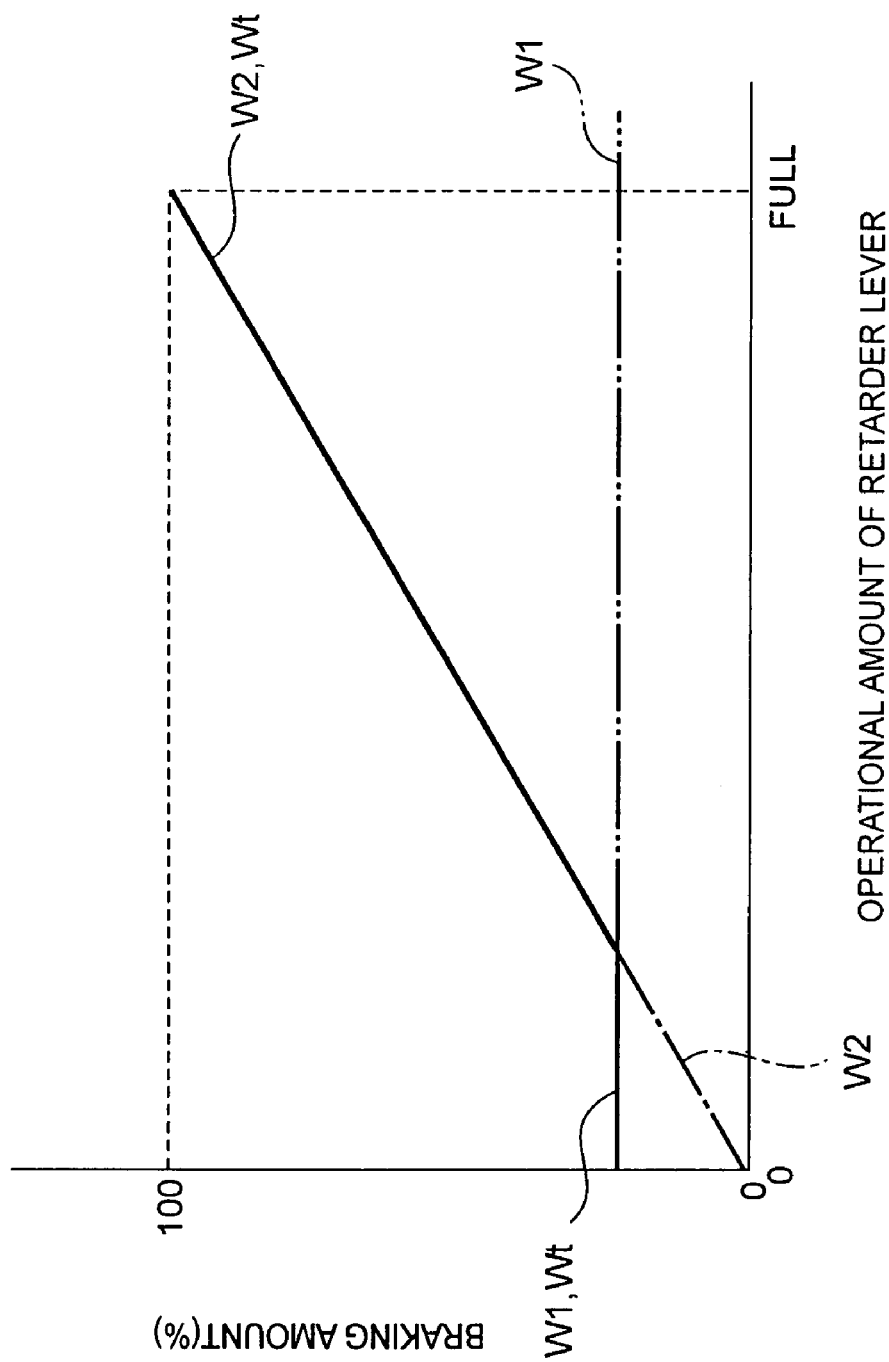
FIG. 12 is a graph determining the total braking amount of the retarder (an embodiment)

Alternatively, as shown in FIG. 12, one of the automatic braking amount W1 and the manual braking amount W2 in proportion to the operational amount of the retarder lever 54 which is larger may be the total braking amount Wt.

The total braking amount Wt is determined by taking into account the automatic braking amount W1 of the retarder as well as the manual braking amount W2 of the retarder lever 54. When only a braking force by the automatic braking amount W1 is not enough, a sufficient braking force according to the intension of the operator can be obtained.

Gear change from a certain gear step to another gear step during operation of the retarder will be described.

In the middle of gear change, the automatic braking amount computation unit 75 of the retarder controller 33 holds the automatic braking amount W1 of the retarder before gear change to continuously operate the retarder. At the completion of gear change, the automatic braking amount W1 of the retarder is determined based on the gear step and the engine rotational speed after gear change.

Even if gear change is performed during operation of the retarder, the retarder is operated by the braking amount before gear change. During gear change, the effectiveness of the retarder cannot be worsen and the braking amount cannot be changed abruptly.

In the above embodiment, the automatic braking amount W1 of the retarder is determined based on the gear step and the engine rotational speed. The present invention is not limited to this. The automatic braking amount W1 may be determined with other parameters.

The dump truck repeats the loaded vehicle state loaded with a rating loading weight and the unloaded vehicle state. The break effectiveness is greatly different between the loaded vehicle state and the unloaded vehicle state. The automatic braking amount W1 is determined according to whether the vehicle is in unloaded vehicle state or in loaded vehicle state. More suitable retarder control can be made. For instance, the automatic braking amount determination data shown in FIGS. 8 and 9 may be compensated according to the loading weight of the load determined in step S13, and the automatic braking amount W1 of the retarder may be increased as the loading weight becomes larger.

Alternatively, the automatic braking amount W1 according to the loading weight of a load may be determined as follows. The automatic braking amount determination data shown in FIGS. 8 and 9 is stored as automatic braking amount determination data in unloaded vehicle state in the storage unit 73. Automatic braking amount determination data having a characteristic in which a braking amount is larger than the automatic braking amount determination data in unloaded vehicle state is stored previously as automatic braking amount determination data in loaded vehicle state in the storage unit 73.

By the loading weight calculated based on output signals of the suspension pressure detectors 22, 23, it is judged whether the vehicle is in unloaded vehicle state or in loaded vehicle state. When it is judged that the vehicle is in unloaded vehicle state, the automatic braking amount determination data in unloaded vehicle state is used to determine the automatic braking amount W1. When it is judged that the vehicle is in loaded vehicle state, the automatic braking amount determination data in loaded vehicle state is used to determine the automatic braking amount W1. Compensation for determining the automatic braking amount W1 according to the loading weight is unnecessary. Computation becomes simple.

In the above description, the front brake 48F and the center brake 48C are used as the retarder. The present invention is not limited to this. For instance, they may be combined with other brakes to constitute the retarder. Alternatively, a braking mechanism only for the retarder may be provided.

The storage unit 73 stores the automatic braking amount determination data as a graph. For instance, the storage unit 73 may store it as a table or may store a predetermined computation equation for computation.

The transmission controller 66 transmits a signal to the retarder controller 33 using the communication bus 91. The present invention is not limited to use of the bus 91. Other signal transmission means may be used. Signals outputted from the manual braking signal detection means 55 and the vehicle state detection means 81 may be directly inputted to the retarder controller 33 without passing through the transmission controller 66.

The retarder controller 33 identifies a gear step based on the gear step instruction signal outputted from the transmission controller 66. The transmission controller 66 is used as the gear step detection means. The present invention is not limited to this. For instance, a detector for identifying a gear step may be provided additionally in the transmission 36.

In the above description, the articulated dump truck 11 is taken as an example. A rigid dump truck in which the front body 24 and the rear body 25 are not bent can be applied likewise.

In the above description, the mechanically driven dump truck 11 transmitting the driving force of the engine 34 via the transmission 36 to the driving wheels 17, 18, and 19 is taken as an example. The present invention is not limited to this. For instance, the present invention can be applied to an electrically driven dump truck running by driving an electric motor by electric power supplied from a battery and a hydraulically driven dump truck running by driving a hydraulic motor by oil discharged from a hydraulic pump driven by an engine.

In the above-described embodiment concerning the mechanically driven dump truck, the constitution using the engine rotational speed and the gear step of the transmission as the vehicle speed-related value according to the present invention is taken as an example. The engine rotational speed detector 51 and the transmission controller 66 as the gear step detection means correspond to the vehicle speed-related value detection means according to the present invention. The engine rotational speed detector 51 and the transmission controller 66 detect the vehicle speed-related value.

Figure 13:
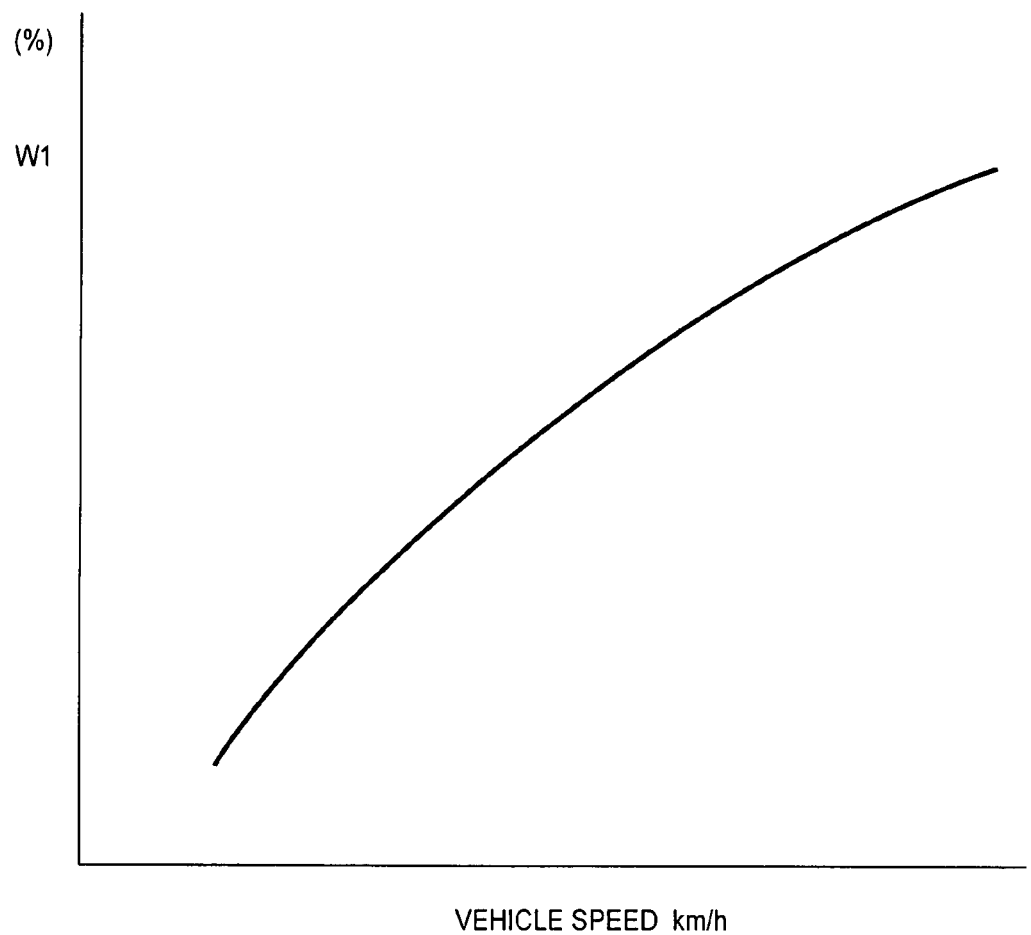
FIG. 13 is a graph showing a vehicle speed-automatic braking amount characteristic (an embodiment).

As shown in FIG. 13, the electrically driven dump truck and the hydraulically driven dump truck have a characteristic in which as a vehicle speed is increased, the automatic braking amount W1 becomes larger. As the vehicle speed-related value detection means according to the present invention, a vehicle speed detector is used. The electrically driven dump truck controls a brake resistance value changed in response to the operational amount of the brake pedal according to the automatic braking amount W1 to control braking.

A plurality of characteristics similar to FIG. 13 are stored and set to be selectively switched by the driver. The braking effectiveness when the accelerator is off can be selected according to a vehicle state and preference of the driver.

The invention claimed is:

1. A retarder control device, comprising:
   an engine rotational speed detector that detects an engine rotational speed;
   a gear step detection apparatus for detecting a gear step of a transmission;
   an accelerator operation detection apparatus for detecting an operational state of an accelerator; and
   a retarder controller that stores automatic braking amount determination data representing a relationship between an engine rotational speed and an automatic braking amount of a retarder corresponding to each of a plurality of gear steps of the transmission, and the retarder controller controls the retarder according to the automatic braking amount of the retarder calculated from said automatic braking amount determination data based on the detected engine rotational speed and gear step of the transmission when the accelerator is judged to be off from the detected operational state of the accelerator.

2. The retarder control device according to claim 1, further comprising a loading weight detector detecting loading weight of a load, wherein said retarder controller increases the automatic braking amount of the retarder as the loading weight becomes larger.

3. The retarder control device according to claim 2, wherein
   said retarder controller stores, as said automatic braking amount determination data, automatic braking amount determination data for an unloaded vehicle state, and automatic braking amount determination data for a loaded vehicle state,
   an automatic braking amount of the loaded vehicle state from the automatic braking amount determination data is larger than an automatic braking amount from the automatic braking amount determination data of the unloaded vehicle state,
   the retarder controller judges based on an output from said loading weight detector whether the vehicle is in the loaded vehicle state or in the unloaded vehicle state,
   the retarder controller selects based on said judgment either the automatic braking amount determination data for the loaded vehicle state or the automatic braking amount determination data for the unloaded vehicle state, and
   the retarder controller calculates the automatic braking amount of the retarder from the selected automatic braking amount determination data.

4. The retarder control device according to claim 1, further comprising a manual braking signal detection apparatus for detecting an operational amount of a manual braking signal input device, wherein said retarder controller controls the retarder with a total braking amount of the retarder, which is calculated by subjecting a manual braking amount of the retarder that is calculated based on the detected operational amount of the manual braking signal input device and said automatic braking amount to a predetermined weighting, respectively, and adding the weighted manual braking amount and the automatic braking amount.

5. A retarder control method comprising:
   providing stored automatic braking amount determination data representing a relationship between an engine rotational speed and an automatic braking amount of a retarder corresponding to each of a plurality of gear steps of a transmission;
   detecting the engine rotational speed, the gear step of the transmission, and an operational state of an accelerator; and
   calculating an automatic braking amount of the retarder from said automatic braking amount determination data based on the detected engine rotational speed and the detected gear step of the transmission when the accelerator is judged to be off from the detected operational state of the accelerator.

6. The retarder control method according to claim 5, further comprising:
   detecting an operational amount of a manual braking signal input device;
   calculating a manual braking amount of the retarder based on the detected operational amount of the manual braking signal input device; and
   determining a total braking amount of the retarder by weighting the automatic braking amount and the manual braking amount of said retarder, respectively, and adding the weighted manual braking amount and the automatic braking amount.

7. The retarder control device according to claim 2, further comprising a manual braking signal detection apparatus for detecting an operational amount of a manual braking signal input device, wherein said retarder controller controls the retarder with a total braking amount of the retarder, which is calculated by subjecting a manual braking amount of the retarder that is calculated based on the detected operational amount of the manual braking signal input device and said automatic braking amount to a predetermined weighting, respectively, and adding the weighted manual braking amount and the automatic braking amount.

8. The retarder control device according to claim 3, further comprising a manual braking signal detection apparatus for detecting an operational amount of a manual braking signal input device, wherein said retarder controller controls the retarder with a total braking amount of the retarder, which is calculated by subjecting a manual braking amount of the retarder that is calculated based on the detected operational amount of the manual braking signal input device and said automatic braking amount to a predetermined weighting, respectively, and adding the weighted manual braking amount and the automatic braking amount.

* * * * *